M. H. TYLER.
COMPOUND TOOL.
APPLICATION FILED MAY 1, 1922.
1,437,624. Patented Dec. 5, 1922.
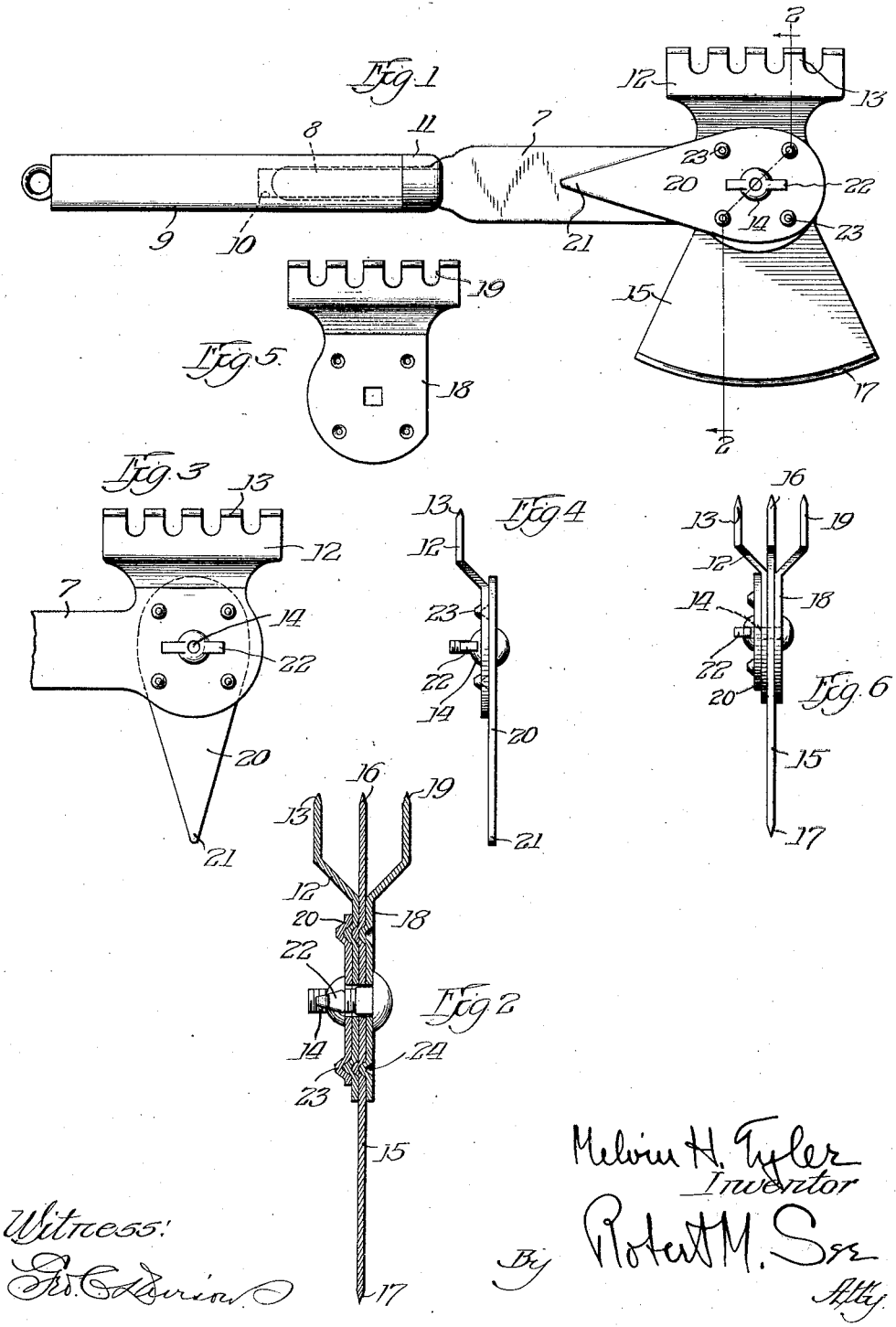

Patented Dec. 5, 1922.

1,437,624

UNITED STATES PATENT OFFICE.

MELVIN H. TYLER, OF TORRANCE, CALIFORNIA, ASSIGNOR TO M. H. TYLER MANUFACTURING CO., OF MUNCIE, INDIANA, A CORPORATION OF INDIANA.

COMPOUND TOOL.

Application filed May 1, 1922. Serial No. 557,517.

*To all whom it may concern:*

Be it known that I, MELVIN H. TYLER, a citizen of the United States, and resident of Torrance, in the county of Los Angeles and State of California, have invented a certain new and useful Improvement in Compound Tools, of which the following is a full, clear, concise, and exact description, reference being had to the accompanying drawings, forming a part of this specification.

The present invention relates to compound tools and particularly to a tool designed to be used as a kitchen utensil. It is an object of the invention to provide a tool with adjustable blades capable of being used in various positions for various purposes and so constructed that the tool is compact and rugged and capable of rigorous use.

In the drawings,—

Figure 1 is a side elevation of a tool embodying the invention.

Figure 2 is a section on the line 2—2 in Figure 1.

Figure 3 is a broken side elevation with certain blades removed and one of the blades in different position than in Figure 1.

Figure 4 is an end elevation of the parts shown in Figure 3.

Figure 5 is a side elevation of one of the blades, and,

Figure 6 is an end elevation of the tool as shown in Figure 1.

The tool comprises a flat metal handle 7 formed at one end with a portion 8 of reduced width. A wooden holder 9 is provided with a central bore 10 to receive the reduced end of the handle 7. The holder is driven onto the handle and a ferrule 11 is wedged on the end of the holder by the handle. The outer end of the handle 7 is formed with an integral blade 12 extending laterally or edgewise from the handle, the blade 12 being preferably formed with a notched edge 13. The outer end of the handle is centrally apertured to receive a pin 14 which is provided with an enlarged head at one end and a wing nut 22 threaded on the other end.

A blade 15 is pivotally mounted on the pin 14 and is formed at one end with a notched edge 16 corresponding with that of the blade 12 and is formed at the other end with a curved knife edge 17. A blade 18 is also pivotally mounted on the pin 14, this blade being a single ended blade provided with a notched edge 19 corresponding with the notched edge of the blade 12. A single ended blade 20, provided with a pointed end 21, is also pivotally mounted on the pin 14. The outer end of the handle and each of the blades are formed on one side with a plurality of projections 23 and on the other side with a plurality of recesses 24. The outer end of the handle and the blades lie against the adjacent member or members and in any adjusted position of the several blades the projections and recesses of the adjacent members engage one another effectually to prevent relative movement of the handle and blades. After the blades have been adjusted the wing nut 22 is tightened to clamp the handle and all of the blades securely together.

Experience indicates that it is preferable to form the handle with an integral projection in one direction only and notched as shown, and to provide a central double ended blade and an additional single ended notched blade as illustrated. In this construction the blade on the handle and the other outer notched blade are offset. It will be understood, however, that the invention lends itself to the multiplication of blades and to the interchange of position of blades. In each case, however, all of the blades will be comparatively thin metal blades pivoted to and disposed parallel with the flat metal handle so that all of the members may be clamped securely together to provide a compact and rigid structure. The tool illustrated is particularly adapted to the tendering of meat by use of the notched edges of the blades; to the cutting of meat or other material by the curved knife edge of the double ended blade; to the chopping of vegetables in a deep bowl by swinging the curved knife edge to a position aligned with the handle; and to the shaving of ice by the curved knife edge or to the picking of ice by the pointed end blade. Obviously, however, the tool is adapted to innumerable other uses.

Having thus described my invention, what I claim as new and desire to secure by Letters Patent of the United States is:—

1. In a compound tool, the combination of a metal handle formed with a flat outer part, a plurality of metal blades pivoted to the handle, one of the blades being double-ended, the blades being formed with flat parts parallel with the flat part of the handle and said flat parts bearing laterally against the adjacent parts, one edge of the double-end blade being spaced laterally from the edge of the other blade, and means for securing the pivoted blades in fixed position.

2. In a compound tool, the combination of a metal handle formed with a flat outer end and an integral blade extending edgewise therefrom, a metal blade pivoted to the handle and formed with a flat part parallel with and bearing laterally against the flat end of the handle, the edges of said integral blade and said pivoted blade being spaced from each other laterally, and means for securing the pivoted blade in fixed position.

3. In a compound tool, the combination of a metal handle formed with a flat outer end and an integral blade extending edgewise therefrom, a metal blade pivoted to the handle and formed with a flat part parallel with and bearing laterally against the flat end of the handle, one of said blades being double-ended, and means for securing the pivoted blade in fixed position.

4. In a compound tool, the combination of a flat metal handle formed at its outer end with an integral blade extending edgewise from the handle, a double-end blade disposed parallel with the outer end of the handle and pivoted thereto, one end of the blade being formed to correspond with said integral blade, and means for securing the blade in adjusted position.

5. In a compound tool, the combination of a flat metal handle formed at its outer end with an integral blade extending edgewise from the handle and formed with a notched edge, a pin extending transversely through the outer end of the handle, a blade pivoted on the pin, one end of the blade being formed with a notched edge and its opposite end being formed with a curved knife edge, and means for securing the blade in adjusted position.

6. In a compound tool, the combination of a flat metal handle formed at its outer end with an integral blade extending edgewise from the handle and formed with a notched edge, a pin extending transversely through the outer end of the handle, a blade pivoted on the pin, one end of the blade being formed with a notched edge and its opposite end being formed with a curved knife edge, a single-end blade pivoted on the pin and formed with a notched edge, the handle and blades lying against adjacent blades, and means for securing the blades in adjusted position.

In witness whereof, I hereunto subscribe my name this 14th day of April, 1922.

MELVIN H. TYLER.